(12) United States Patent
Sept

(10) Patent No.: US 11,584,414 B2
(45) Date of Patent: Feb. 21, 2023

(54) DOLLY ASSEMBLY

(71) Applicant: Nathan Sept, Three Hills (CA)

(72) Inventor: Nathan Sept, Three Hills (CA)

(*) Notice: Subject to any disclaimer, the term of this patent is extended or adjusted under 35 U.S.C. 154(b) by 159 days.

(21) Appl. No.: 17/183,457

(22) Filed: Feb. 24, 2021

(65) Prior Publication Data

US 2022/0266885 A1    Aug. 25, 2022

(51) Int. Cl.
*B62B 1/10* (2006.01)
*B62B 1/18* (2006.01)

(52) U.S. Cl.
CPC . *B62B 1/18* (2013.01); *B62B 1/10* (2013.01)

(58) Field of Classification Search
CPC .... B62B 1/10; B62B 1/18; B62B 1/12; B62B 1/125; B62B 1/14; B62B 1/142; B62B 1/145; B62B 1/147
See application file for complete search history.

(56) References Cited

U.S. PATENT DOCUMENTS

| | | | |
|---|---|---|---|
| 4,179,132 A | 12/1979 | Rich | |
| 4,339,141 A * | 7/1982 | Thiboutot | B62B 1/12 280/42 |
| 4,407,521 A * | 10/1983 | Zeitlin | B62B 1/125 280/655 |
| 6,582,201 B2 | 6/2003 | Lucchi | |
| D521,709 S | 5/2006 | Johnson | |
| D564,724 S | 3/2008 | Dethier | |
| 8,579,304 B2 | 11/2013 | Setzer | |
| 10,244,673 B2 | 4/2019 | Henry | |
| 10,272,935 B1 * | 4/2019 | Jordan | B65H 49/325 |
| 2008/0224431 A1 | 9/2008 | Reinicke | |
| 2012/0032408 A1* | 2/2012 | Greene | B62B 3/104 280/47.35 |
| 2018/0283787 A1 | 10/2018 | Bell | |

* cited by examiner

*Primary Examiner* — Bryan A Evans

(57) ABSTRACT

A dolly assembly for transporting a grain aeration fan includes a frame, which is shaped and sized so that the frame is complementary to a base of load. Each of a pair of wheels is engaged to a respective opposed end of an axle. The axle is engaged to a back of the frame and extends from a first side of the frame past a second side thereof. A handle is engaged to the back of the frame proximate to the second side. A user can grasp the handle and tilt the frame so that a center of mass of the load is positioned above the axle. A forward view of the user is not blocked by the load. A leveling unit is engaged to and extends perpendicularly from the frame proximate to a front thereof. The leveling unit and the wheels support the frame in a substantially horizontal configuration.

10 Claims, 5 Drawing Sheets

DOLLY ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to dolly assemblies and more particularly pertains to a new dolly assembly for transporting a grain aeration fan.

(2) Description of Related Art Including Information Disclosed Under 37 CFR 1.97 and 1.98

The prior art relates to dolly assemblies. Prior art dolly assemblies may comprise dollies, handcarts, rollable frames, and the like, which have a handle centrally positioned on and extending from a rear thereof. What is lacking in the prior art is a dolly assembly wherein a handle of a dolly is offset from a centerline of a frame of the dolly, enabling a user to see past a load, such as a grain aeration fan, positioned thereupon.

BRIEF SUMMARY OF THE INVENTION

An embodiment of the disclosure meets the needs presented above by generally comprising a frame, which is shaped and sized so that the frame is complementary to a base of load and thus configured for positioning of the load thereupon. Each of a pair of wheels is engaged to a respective opposed end of an axle, which is engaged to a back of the frame and extends from a first side of the frame past a second side thereof. A handle is engaged to the back of the frame proximate to the second side and extends perpendicularly from the frame.

The handle is configured to be grasped in a hand of a user, positioning the user to tilt the frame so that a center of mass of the load is positioned above the axle. A forward view of the user is not blocked by the load. A leveling unit is engaged to and extends perpendicularly from the frame proximate to a front thereof. The leveling unit and the wheels are configured to support the frame in a substantially horizontal configuration.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
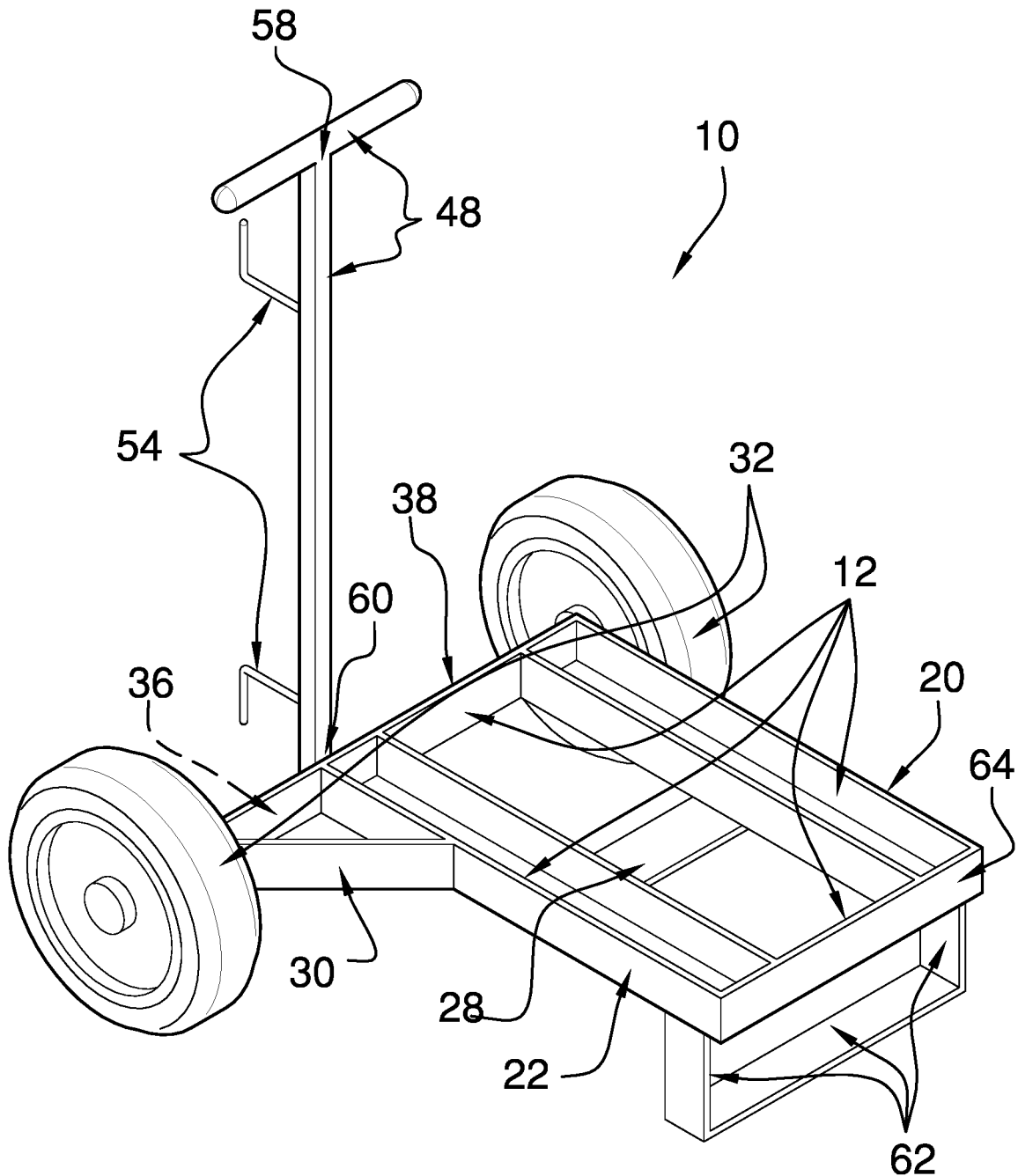
FIG. 1 is an isometric perspective view of a dolly assembly according to an embodiment of the disclosure.

With reference now to the drawings, and in particular to FIGS. 1 through 5 thereof, a new dolly assembly embodying the principles and concepts of an embodiment of the disclosure and generally designated by the reference numeral 10 will be described.

As best illustrated in FIGS. 1 through 5, the dolly assembly 10 generally comprises a frame 12, which is shaped and sized so that the frame 12 is complementary to a base of load and thus configured for positioning of the load thereupon. The frame 12 comprises a pair of C-channels 14, a first plate 16, and a second plate 18. The C-channels 14 are upward facing and are positioned in parallel to define a first side 20 and a second side 22 of the frame 12. The first plate 16 is engaged to each C-channel 14 at a forward end 24 thereof and extends therebetween. The second plate 18 is engaged to each C-channel 14 at a rearward end 26 thereof and extends therebetween. The second plate 18 extends past the second side 22 of the frame 12.

The frame 12 also may comprise a crossmember 28, which is engaged to and which extends between the C-channels 14. The crossmember 28 is positioned substantially equally distant from the rearward ends 26 and the forward ends 24 of the C-channels 14. The frame 12 also may comprise a brace 30, which is engaged to and which extends angularly between the second plate 18 and the second side 22 of the frame 12.

Figure 2:
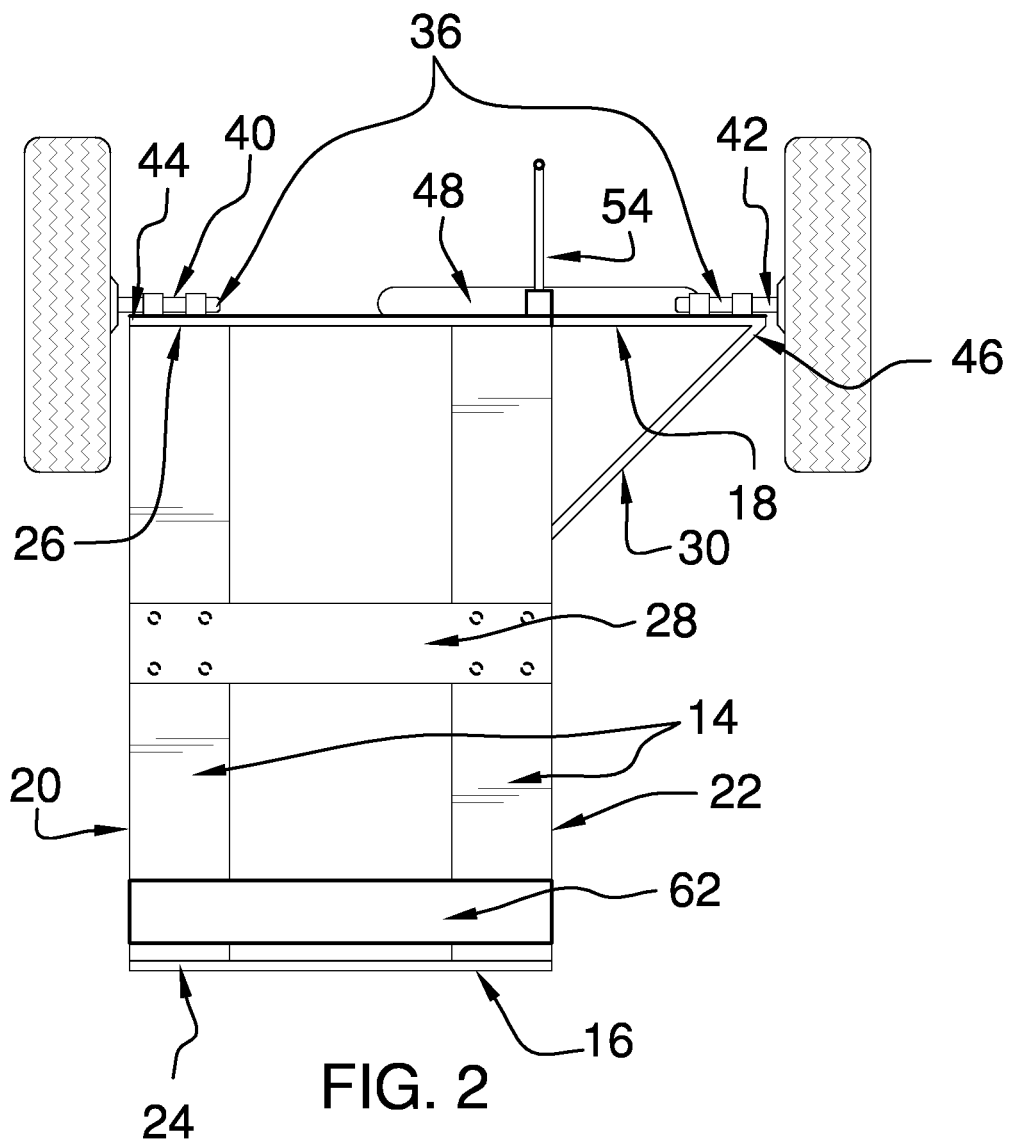
FIG. 2 is a bottom view of an embodiment of the disclosure.
Figure 3:
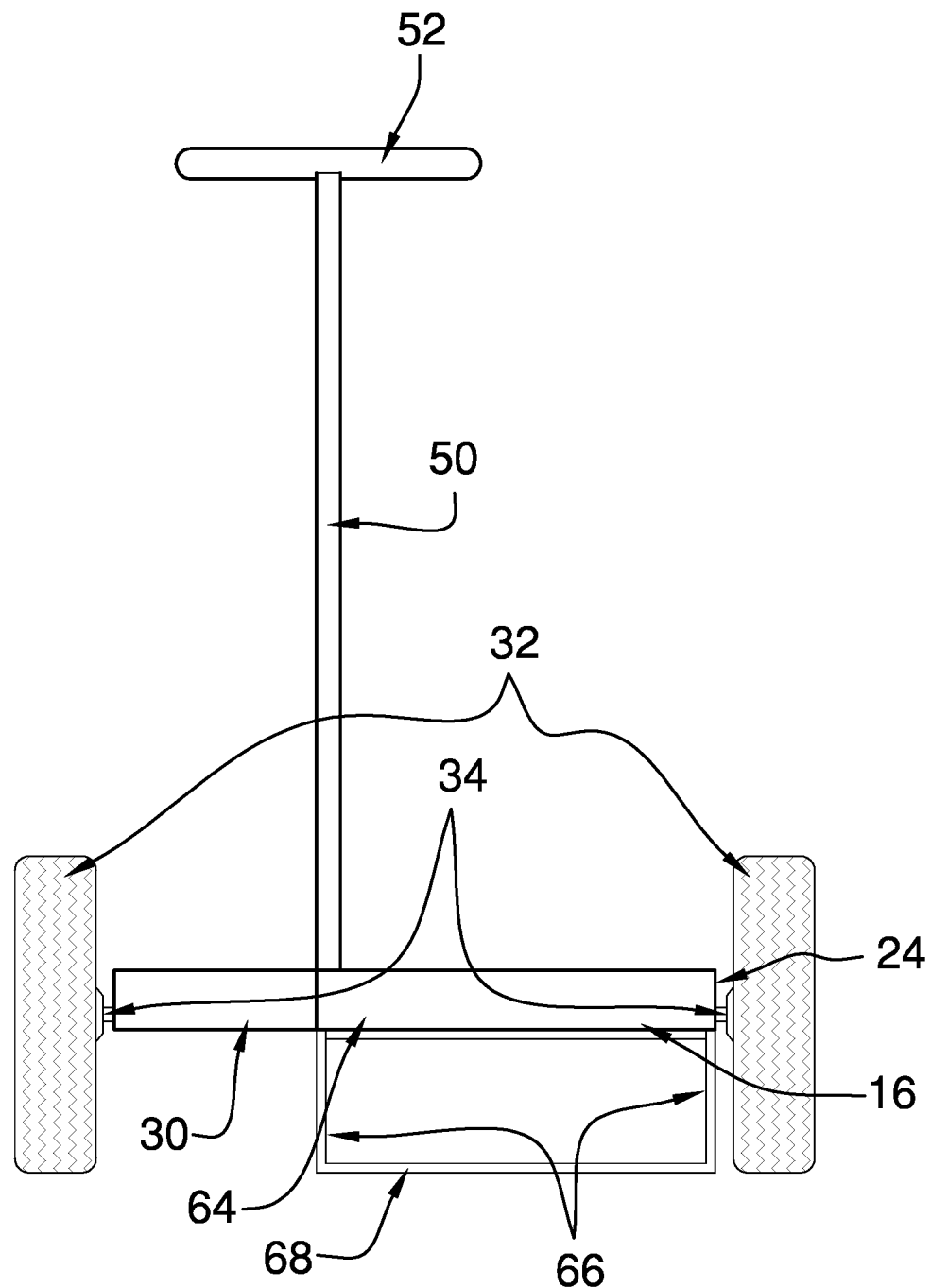
FIG. 3 is a front view of an embodiment of the disclosure.
Figure 4:
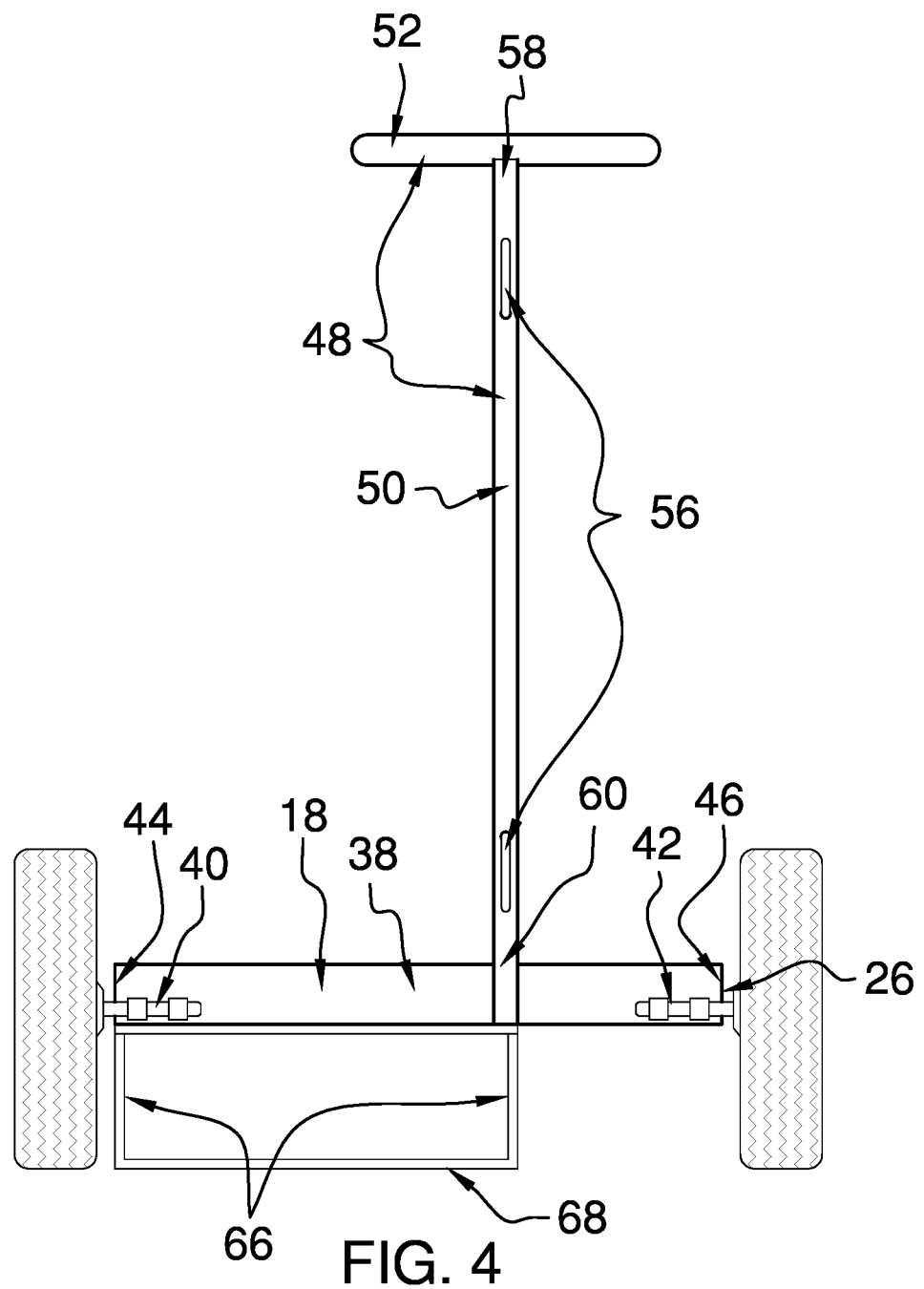
FIG. 4 is a rear view of an embodiment of the disclosure.

Each of a pair of wheels 32 is engaged to a respective opposed end 34 of an axle 36. The axle 36 is engaged to a back 38 of the frame 12 and extends from the first side 20 past the second side 22 of the frame 12. The axle 36 may comprise a first shaft 40 and a second shaft 42, as shown in FIGS. 2 and 4. The first shaft 40 is engaged to a first end 44 of the second plate 18. The second shaft 42 is engaged to a second end 46 of the second plate 18. The wheels 32 are rotationally and singly engaged to the first shaft 40 and the second shaft 42.

A handle 48 is engaged to the back 38 of the frame 12, proximate to the second side 22, and extends perpendicularly from the frame 12. The handle 48 is configured to be grasped in a hand of a user, positioning the user to tilt the frame 12 so that a center of mass of the load is positioned above the axle 36. A forward view of the user is not blocked by the load. The handle 48 comprises a first rod 50 and a second rod 52, with the former being engaged to the frame 12 and extending substantially perpendicularly therefrom. The second rod 52 is engaged to the first rod 50 distal from the frame 12 and extends bidirectionally therefrom so that the second rod 52 is parallel to the back 38 of the frame 12. The first rod 50 may comprise square tubing, while the second rod 52 may comprise round tubing, as shown in FIG. 1.

Figure 5:
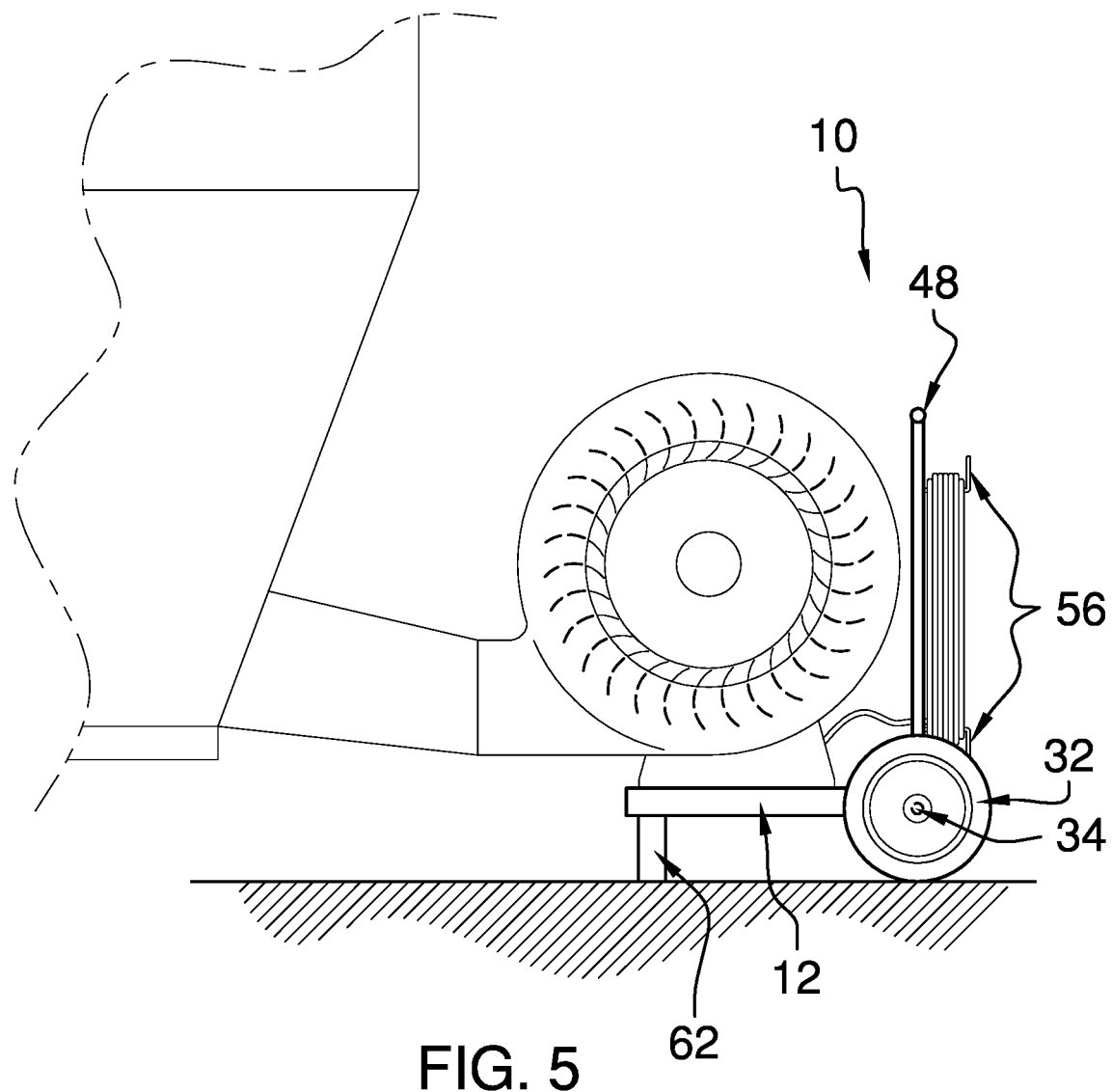
FIG. 5 is an in-use view of an embodiment of the disclosure.

A fastener 54 is engaged to the handle 48 and is configured to engage a power cord so that the power cord is engaged to the handle 48 in a coiled configuration. The fastener 54 may comprise a pair of hooks 56, as shown in FIG. 1. The hooks 56 are engaged singly to the handle 48 proximate to an upper end 58 and a lower end 60 thereof and such that the hooks 56 are opposingly positioned. The pair of hooks 56 is configured for wrapping of the power cord therearound, as shown in FIG. 5. The present invention anticipates the fastener 54 comprising other fastening means, such as, but not limited to, retractable cord reels, hook and loop fasteners, and the like.

A leveling unit 62 is engaged to and extends perpendicularly from the frame 12 proximate to a front 64 thereof. The leveling unit 62 and the wheels 32 are configured to support the frame 12 in a substantially horizontal configuration. The leveling unit 62 comprises a pair of posts 66, or other leveling means, such as, but not limited to, castors, extension legs, and the like. The posts 66 are positioned singly proximate to the first side 20 and the second side 22 of the frame 12. The leveling unit 62 also may comprise a crossbeam 68, which is engaged to and which extends between the posts 66 distal from the frame 12. The crossbeam 68 is positioned to stabilize the posts 66 relative to the frame 12 and to increase a surface area of the leveling unit 62 to limit sinking of the leveling unit 62 when a load is positioned on the frame 12.

In use, the load is positioned on the frame 12. The user grasps and pulls on the handle 48 to tilt the frame 12 so that a center of mass of the load is positioned above the axle 36. A forward view of the user is not blocked by the load. The user can locomote the assembly 10 and the load upon the wheels 32. For example, when a fan unit for drying grain is positioned on the frame 12, a user can reposition the fan unit proximate to one grain bin, and then move it to proximate to another grain bin, to a storage area, or to a trailer for transport to a different location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A dolly assembly comprising:
   a frame, the frame being shaped and sized such that the frame is complementary to a base of load, wherein the frame is configured for positioning of the load thereupon;
   an axle engaged to a back of the frame and extending from a first side of the frame past a second side thereof;
   a pair of wheels, each wheel being engaged to a respective opposed end of the axle;
   a handle engaged to and extending perpendicularly from the frame, the handle extending from the back proximate to the second side of the frame, wherein the handle is configured for grasping in a hand of a user, positioning the user for tilting the frame such that a center of mass of the load is positioned above the axle, and such that a forward view of the user is not blocked by the load; and
   a leveling unit engaged to and extending perpendicularly from the frame proximate to a front thereof, such that the leveling unit and the wheels are configured for supporting the frame in a substantially horizontal configuration; and
   wherein the frame comprises:
      a pair of C-channels, the C-channels being upward facing and positioned in parallel defining the first side and the second side of the frame;
      a first plate engaged to each C-channel at a forward end thereof and extending therebetween;
      a second plate engaged to each C-channel at a rearward end thereof and extending therebetween, the second plate extending past the second side of the frame; and
      a crossmember engaged to and extending between the C-channels, the crossmember being positioned substantially equally distant from the rearward ends and the forward ends of the C-channels.

2. A dolly assembly comprising:
   a frame, the frame being shaped and sized such that the frame is complementary to a base of load, wherein the frame is configured for positioning of the load thereupon;
   an axle engaged to a back of the frame and extending from a first side of the frame past a second side thereof;
   a pair of wheels, each wheel being engaged to a respective opposed end of the axle;
   a handle engaged to and extending perpendicularly from the frame, the handle extending from the back proximate to the second side of the frame, wherein the handle is configured for grasping in a hand of a user, positioning the user for tilting the frame such that a center of mass of the load is positioned above the axle, and such that a forward view of the user is not blocked by the load;

a leveling unit engaged to and extending perpendicularly from the frame proximate to a front thereof, such that the leveling unit and the wheels are configured for supporting the frame in a substantially horizontal configuration; and wherein the frame comprises:
- a pair of C-channels, the C-channels being upward facing and positioned in parallel defining the first side and the second side of the frame;
- a first plate engaged to each C-channel at a forward end thereof and extending therebetween;
- a second plate engaged to each C-channel at a rearward end thereof and extending therebetween, the second plate extending past the second side of the frame; and
- a brace engaged to and extending angularly between the second plate and the second side of the frame.

3. A dolly assembly comprising:

a frame, the frame being shaped and sized such that the frame is complementary to a base of load, wherein the frame is configured for positioning of the load thereupon;

an axle engaged to a back of the frame and extending from a first side of the frame past a second side thereof;

a pair of wheels, each wheel being engaged to a respective opposed end of the axle;

a handle engaged to and extending perpendicularly from the frame, the handle extending from the back proximate to the second side of the frame, wherein the handle is configured for grasping in a hand of a user, positioning the user for tilting the frame such that a center of mass of the load is positioned above the axle, and such that a forward view of the user is not blocked by the load;

a leveling unit engaged to and extending perpendicularly from the frame proximate to a front thereof, such that the leveling unit and the wheels are configured for supporting the frame in a substantially horizontal configuration; and wherein the frame comprises:
- a pair of C-channels, the C-channels being upward facing and positioned in parallel defining the first side and the second side of the frame;
- a first plate engaged to each C-channel at a forward end thereof and extending therebetween; and
- a second plate engaged to each C-channel at a rearward end thereof and extending therebetween, the second plate extending past the second side of the frame; and wherein the axle comprises a first shaft engaged to a first end of the second plate and a second shaft engaged to a second end of the second plate; and wherein the wheels being rotationally and singly engaged to the first shaft and the second shaft.

4. The dolly assembly of claim 1, wherein the handle comprises a first rod and a second rod, the first rod being engaged to the frame and extending substantially perpendicularly therefrom, the second rod being engaged to the first rod distal from the frame and extending bidirectionally therefrom, such that the second rod is parallel to the back of the frame.

5. The dolly assembly of claim 4, wherein the first rod comprises square tubing, the second rod comprising round tubing.

6. The dolly assembly of claim 1, further including a fastener engaged to the handle and being configured for engaging a power cord, such that the power cord is engaged to the handle in a coiled configuration.

7. The dolly assembly of claim 6, wherein the fastener comprises a pair of hooks engaged singly to the handle proximate to an upper end and a lower end thereof, the hooks being opposingly positioned, wherein the pair of hooks is configured for wrapping of the power cord therearound.

8. The dolly assembly of claim 1, wherein the leveling unit comprises a pair of posts, the posts being positioned singly proximate to the first side and the second side of the frame.

9. The dolly assembly of claim 8, further including the leveling unit comprising a crossbeam engaged to and extending between the posts distal from the frame, such that the crossbeam is positioned for stabilizing the posts relative to the frame.

10. The dolly assembly of claim 1, further comprising:

the frame comprising
- a brace engaged to and extending angularly between the second plate and the second side of the frame;

the axle comprising a first shaft engaged to a first end of the second plate and a second shaft engaged to a second end of the second plate;

the wheels being rotationally and singly engaged to the first shaft and the second shaft;

the handle comprising a first rod and a second rod, the first rod being engaged to the frame and extending substantially perpendicularly therefrom, the second rod being engaged to the first rod distal from the frame and extending bidirectionally therefrom, such that the second rod is parallel to the back of the frame, the first rod comprising square tubing, the second rod comprising round tubing;

a fastener engaged to the handle and being configured for engaging a power cord, such that the power cord is engaged to the handle in a coiled configuration, the fastener comprising a pair of hooks engaged singly to the handle proximate to an upper end and a lower end thereof, the hooks being opposingly positioned, wherein the pair of hooks is configured for wrapping of the power cord therearound; and the leveling unit comprising a pair of posts, the posts being positioned singly proximate to the first side and the second side of the frame, the leveling unit comprising a crossbeam engaged to and extending between the posts distal from the frame, such that the crossbeam is positioned for stabilizing the posts relative to the frame.

* * * * *